June 29, 1965

R. G. J. MARTIN ETAL 3,191,270

ELECTRIC MOTORS

Filed Dec. 11, 1959

3,191,270
ELECTRIC MOTORS

Ronald George John Martin, Overstone, Peter Stanwell, Wanstead, and Henry F. Davies, Buckingham, England, assignors to The Plessey Company Limited, London, England, a company of Great Britain
Filed Dec. 11, 1959, Ser. No. 859,073
Claims priority, application Great Britain, Dec. 12, 1958, 40,111/58
1 Claim. (Cl. 29—155.53)

This invention relates to electric motors and more particularly to induction motors. Several types of induction motors are already known such as polyphase induction type, and single phase induction types such as split phase, shaded pole, repulsion, synchronous and capacity start and capacity start and run.

In general, induction motor includes a rotor and a stator made from ferrous laminations in order to reduce eddy current losses. Such laminations are usually pressed from sheet material and in order to reduce production costs a single tool is used for this pressing. In induction types of motor the rotor usually includes a stack of circular laminations around the periphery of each of which slits or holes are pierced into which slits or holes are inserted rods or bars of conducting material. The conducting rods or bars are secured to end plates formed from conducting material. Alternatively the holes or slits are filled with aluminum by means of a die-casting technique.

In such motors it is necessary to arrange that at no time shall the magnetic fields of the stator be parallel with the rotor conductor or otherwise the operation of the motor will be uneven owing to the mutual magnetic fields setting up a cogging motion. It is usual to arrange that the stator poles are parallel with the axis of the motor, because only one press tool is used in the blanking stage and at some stage of manufacture, the rotor is twisted longitudinally in order to provide the necessary skew. The short-coming of this method is that the rotor conductors do not necessarily move evenly and a rotor is produced which is electrically unbalanced which can give rise to a further type of uneven performance.

According to a first aspect of the present invention there is provided an electric motor having a stator and/or rotor made from ferrous particles, flakes or granules.

According to a second aspect of the invention there is provided a method of making an electric motor comprising the steps of pressing out from a mixture of ferrous particles, flakes or granules and an insulating binder a plurality of cylindrical laminations each having axially directed slots which are inclined with respect to a plane intersecting the axis of the lamination, stacking the laminations one above the other to form a cylindrical body, inserting rods or bars of copper into the slots formed in the stack, re-pressing the assembly of laminations and copper bars with copper at each end of the stack to provide copper cylindrical annular end plates to the stack and sintering the re-pressed assembly in reducing atmosphere to sinter laminations and the copper to a coherent single body.

In order to ease the difficulties of manufacture and to overcome the disadvantages of "skewing" the rotor, the motors, which are the subject of this invention, it is preferred to have the stator poles inclined to the motor axis and the rotor conductors are parallel to the motor axis. It is preferred to connect the rods or bars together with copper dust, and to sinter the complete rotor assembly in order to give the necessary mechanical strength and high electrical conductivity of the conducting members required in such a rotor. The ferrous particles are insulated from each other by means of an inorganic binder which will withstand the sintering temperature.

For a better understanding of the invention one constructional form of a motor will be described in greater detail with reference to the drawing accompanying the specification, in which—

Figure 1:
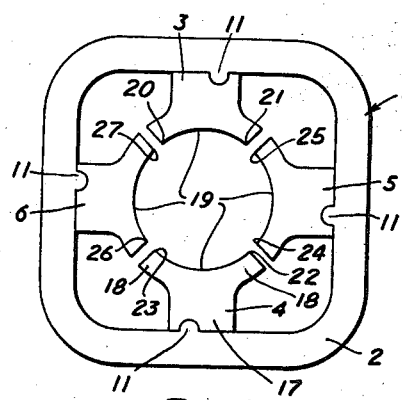
FIGURE 1 is a schematic illustration of the stator of a shaded pole motor.

In FIGURE 1 a stator 1 includes three or five components, i.e. either an outer frame 2 and four separate pole pieces 3, 4, 5 and 6 or alternatively a combination of the frame 2, and the pole pieces 3 and 4 together with separate poles 5 and 6. Energising coils (not shown) are wound around poles 5 and 6. In either arrangement the sides of the pole pieces are not parallel to the axis of the motor but are inclined at such an angle that they are equal to or a little greater than the angle subtended by two adjacent bars 7 or 8 (FIGURE 4) in the rotor 9 in order to give a cog-free motion. "Each pole piece 3, 4, 5 and 6 includes a main body portion 17 and two wing portions 18 integrally connected therewith. The inner faces 19 of the poles 3, 4, 5 and 6 terminate in two edges 20, 21; 22, 23; 24, 25; 26, 27; and 28, 28 respectively.

Figure 2:
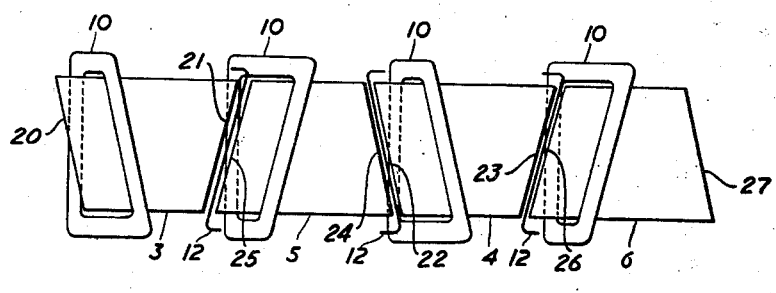
FIGURE 2 is a schematic representation of the pole faces of the motor of FIGURE 1.

The actual arrangement of the pole pieces is shown in FIGURE 2. This figure is a development of the pole piece configuration of FIGURE 1 illustrating the actual developed shapes of the pole pieces 3 4, 5 and 6. It will be clear from FIGURE 2 that the edges of each pair of edges 20, 21; 22, 23; 24, 25; 26, 27; and 28, 29 respectively of the pole pieces are not parallel to each other but are tapered.

Shading rings marked 10 are fitted to each of the four poles. These shading rings are preferably made by being pressed from copper sheet but may be made of copper wire and welded to give a low resistance path. The pole pieces 3, 4, 5 and 6 are locked in place by means of the keyway shown at 11, and by means of pieces of wire or strip of non-ferrous material shown at 12, which are bent at their ends in such direction that the side pole pieces are held firmly in position. Other methods of fixing the pole pieces 3, 4, 5 and 6 may be employed such as by screws or affixing with an epoxy resin or by other such means.

Figure 3:
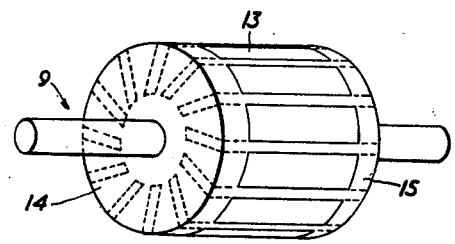
FIGURE 3 is a perspective view of a rotor for the motor of FIGURE 1.
Figure 4:
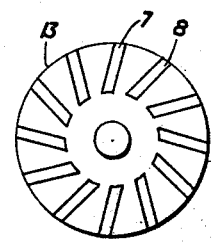
FIGURE 4 is a section taken of a plane which is perpendicular to the axis of the rotor of FIGURE 3.

The arrangement of the rotor 9 is shown in FIGURES 3 and 4 and includes a cylindrical pressing 13 of ferrous flake or granular material. It is convenient to make this form a number of thin pressings stacked together in order to simplify difficulties of manufacture. The separate granules or flakes are insulated from each other by means of an inorganic material which will not disintegrate when the complete assembly is sintered. Rods or bars 7, 8 of copper are inserted in these slots formed in the pressing 13 and the assembly is re-pressed with copper powder at the top and bottom (as at 14 and 15) of the assembly and the complete rotor 9 sintered in a suitable reducing atmosphere in order to prevent oxidation of the metals used.

What we claim is:

A method of making a squirrel-cage rotor of non-laminated construction for an electric motor, comprising the steps of:

(a) preparing a mixture consisting of ferrous material in divided form, (b) pressing from the said material a plurality of identical cylindrical laminations having each a plurality of slots extending inwardly from the cylindrical surface of the body,
(c) stacking the said cylindrical laminations co-axially and with the said slots in adjacent laminations aligned to form a slotted laminated cylinder,
(d) inserting into each slot a conductor bar of length equal to the length of the slot in the laminated cylinder,
(e) applying to each end of the laminated cylinder a conductive metal in divided form in an area defining a rotor end ring joining the ends of the conductor bars, and
(f) heating the assembly in a reducing atmosphere to a temperature sufficient to sinter the conductive metal and to sinter and unite the ferrous laminations into a coherent non-laminated body.

References Cited by the Examiner

UNITED STATES PATENTS

| | | | |
|---|---|---|---|
| 2,047,487 | 7/36 | O'Leary | 310—211 X |
| 2,125,970 | 8/38 | Waters | 29—155.53 |
| 2,695,969 | 11/54 | Yates | 310—43 X |
| 2,721,278 | 10/55 | Baumann et al. | 310—44 |
| 2,834,895 | 5/58 | Papst | 310—44 |
| 2,913,819 | 11/59 | Andreotti et al. | 310—44 |
| 2,950,401 | 8/60 | Evans et al. | 310—44 |
| 2,975,310 | 3/61 | Armstrong et al. | 310—211 X |
| 2,996,791 | 8/61 | Hicks | 29—155.53 |

FOREIGN PATENTS 512,047  4/55  Canada.

WHITMORE A. WILTZ, *Primary Examiner.*

MILTON O. HIRSHFIELD, JOHN F. CAMPBELL,
*Examiners.*